United States Patent
Wilfert et al.

(10) Patent No.: US 8,604,977 B2
(45) Date of Patent: Dec. 10, 2013

(54) REAL-TIME MARKUP OF MAPS WITH USER-GENERATED CONTENT

(75) Inventors: Nathan S. Wilfert, Redmond, WA (US); Alec Siu, Seattle, WA (US); Roberto R. Molinari, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 43 days.

(21) Appl. No.: 13/333,154

(22) Filed: Dec. 21, 2011

(65) Prior Publication Data

US 2013/0166640 A1 Jun. 27, 2013

(51) Int. Cl.
*G01S 19/00* (2010.01)
(52) U.S. Cl.
USPC ...... 342/450; 342/452; 342/357.34; 709/217; 709/218; 709/219
(58) Field of Classification Search
USPC ........ 342/357.13, 450, 452, 357.34; 709/229, 709/217, 218, 219; 701/300, 202; 345/659; 707/736, 739, 748; 705/14.36; 715/781; 348/36
See application file for complete search history.

(56) References Cited

U.S. PATENT DOCUMENTS

| | | | |
|---|---|---|---|
| 2008/0104530 A1 | 5/2008 | Santanche et al. | |
| 2008/0204317 A1* | 8/2008 | Schreve et al. | 342/357.13 |
| 2009/0248883 A1* | 10/2009 | Suryanarayana et al. | 709/229 |
| 2009/0319188 A1* | 12/2009 | Otto | 701/300 |
| 2009/0322790 A1* | 12/2009 | Behar et al. | 345/659 |
| 2010/0121566 A1* | 5/2010 | Joshi et al. | 701/202 |
| 2010/0145947 A1* | 6/2010 | Kolman et al. | 707/736 |
| 2010/0305844 A1* | 12/2010 | Choi et al. | 701/201 |
| 2010/0332310 A1* | 12/2010 | Russell et al. | 705/14.36 |
| 2011/0010674 A1 | 1/2011 | Knize et al. | |
| 2011/0283223 A1* | 11/2011 | Vaittinen et al. | 715/781 |
| 2012/0023103 A1* | 1/2012 | Soderberg et al. | 707/739 |
| 2012/0033032 A1* | 2/2012 | Kankainen | 348/36 |
| 2013/0086077 A1* | 4/2013 | Piippo et al. | 707/748 |

OTHER PUBLICATIONS

Rabaino, Lauren, "A Real-time, Geotagged Flickr Map? Here's How.", Retrieved at <<http://www.mediabistro.com/10000words/create-geotagged-flickr-map-realtim_b5431>>, Retrieved Date: Oct. 20, 2011, pp. 6.
Siliski, Michael, "New in Google Maps for Android: Updated Reviews, Search Filters, and Latitude Real-time Updating", Retrieved at <<http://googlemobile.blogspot.com/2010/10/new-in-google-maps-for-android-updated.html>>, Retrieved Date: Oct. 20, 2011, pp. 6.

(Continued)

*Primary Examiner* — Le H Luu (57) ABSTRACT

User-generated content that is associated with a geographic location is uploaded to existing networked services or directly to a digital map updating service. Distinct digital map updating services can be assigned to defined geographic areas, such that they are only notified of, or poll for, new user-generated content within their defined geographic areas. Utilizing the geographic location associated with such user-generated content, the digital map updating service identifies one or more digital map "tiles", which are updated to include new user-generated content and capable applications on client devices can be notified directly of such new user-generated content if they are accessing the relevant tiles. Additionally, data mining can be performed and deductions of events from data mining can be indicated in the digital map in the same manner.

20 Claims, 3 Drawing Sheets

(56) References Cited

OTHER PUBLICATIONS

Shrestha, et al., "Making Sense of Geographic Data with Dundas Map and AJAX", Retrieved at <<http://www.codeproject.com/KB/showcase/DundasMap_AJAX.aspx>>, Oct. 12, 2006, pp. 5.

Santanche, et al., "SenseWeb: Browsing the Physical World in Real Time", Retrieved at <<http://doc.utwente.nl/75360/1/iiix10.pdf>>, ACM/IEEE Information Processing in Sensor Networks, Apr. 2006, pp. 1-2.

Napoli, et al., "A Step Toward Personalized Social Geotagging", Retrieved at <<http://www.comp.hkbu.edu.hk/~lichen/srs2010/downloads/paper/18-A_Step_toward_Personalized_Social_Geotagging.pdf>>, IUI Workshop on Social Recommender Systems, Feb. 7, 2010, pp. 1-4.

* cited by examiner

REAL-TIME MARKUP OF MAPS WITH USER-GENERATED CONTENT

BACKGROUND

In many instances, the content available from computing devices that are communicationally coupled to one another via network communications can be content that is associated with a geographic location. For example, photographs, descriptions, and information regarding geographic locations such as, for example, famous landmarks, commonly visited areas, retail establishments, and other like locations are often made available to users of computing devices via network communications. Because such content is associated with geographic locations, it can be helpful to users to present such content within the context of a map that can enable users to quickly identify the geographic locations with which such content is associated. As a result, digital mapping services, which provide digital maps to users' computing devices via network communications, are often utilized as a bedrock for the presentation of content that is associated with geographic locations.

Content available from computing devices via network communications often includes user-generated content, such as pictures taken by users, descriptions or reviews written by users, and other like user-generated content. As with any other content, such user-generated content is often associated with geographic locations. For example, many modern digital image capture devices, such as digital cameras, smart phones, tablet computing devices, and other like digital image capture devices comprise the capability to accurately determine their geographic location and can append such information to digital images captured by those devices. Alternatively, for user-generated content that does not have geographic location associated with it, once such user-generated content has been made available to other computing devices via network communications, geographic information associated with such user-generated content can be retroactively appended to it.

Unfortunately, because of the manner in which user-generated content is uploaded, stored and distributed via network communications and the manner in which digital maps are provided via the network communications, it can take hours, or even days, for user-generated content to be provided within the context of a digital map. Thus, current digital maps can be provided with indicia of user-generated content, but such user-generated content was generated a long time ago and does not reflect a current representation of the geographic area where such content is indicated as having been generated. For example, user-generated photographs taken in the downtown area of a small town can be made available within the context of the digital map, such that another user viewing a region of such a digital map that includes that downtown can be presented with the opportunity to view the user-generated photographs. However, those user-generated photographs are likely months, or even years, old and could, for example, include businesses or stores that have since closed or, alternatively, could include empty lots or dilapidated buildings where now new buildings stand.

SUMMARY

In one embodiment, user-generated content that is associated with a geographic location can be provided to an updating service that can identify individual components of a digital map, such as map "tiles", to which such user-generated content applies. The relevant components of the digital map can be updated and users viewing those components of the digital map can, if their client applications support it, receive incremental updates directly. In such a manner the user-generated content can be efficiently presented within the context of the digital map as soon as it is created and made available for consumption by other users via network communications.

In another embodiment, data mining can be performed using the frequency, volume and location of user-generated content to detect patterns or secondary signals from a larger volume of content. An influx of user-generated content, either at a current time or during specific times, in a defined geographic region, can indicate an event or incident in that geographic region, the deduction of which can, likewise, be added to the relevant components of a digital map.

In a further embodiment, a programmatic interface can be provided for registering to receive updates of user-generated content within the context of specific components of a digital map. In particular, when specific components of a digital map are currently being accessed by a dedicated digital map application, that application can utilize the programmatic interface to register to receive updates of user-generated content that is presented within the context of those specific digital map components. Similarly, an interface can be provided for registering to receive notifications of user-generated content that is associated with geographic locations that are located within a defined geographic area.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of user-generated content, associated with geographic location, which is shared via network communications in an expedited manner. User-generated content that is associated with the geographic location can be uploaded to existing networked services or directly to a digital map updating service. Upon being uploaded, the digital map updating service can be notified of the new user-generated content, or it can poll an existing service for such new user-generated content. If distinct digital map updating services are utilized, as opposed to a single digital map updating service, those distinct digital map updating services can be assigned to defined geographic areas, such that a digital map updating service is only notified of, or polls for, new user-generated content within its defined geographic area. Subsequently, utilizing the geographic location associated with such user-generated content, the digital map updating service can identify one or more components of a digital map, such as individual map "tiles", that can be updated to include new user-generated content. Additionally, for capable application programs executing on client computing devices, the digital map updating service can transmit such new user-generated content directly to such application programs if such application programs are accessing the components of the digital map that were identified as being impacted by the new user-generated content. Additionally, data mining can be performed on the received user-generated content such that, an influx of user-generated content, either at the current time or during specific times, within a defined geographic region can indicate an event or incident in that geographic region. The deduction of such an event or incident from data mining can be indicated via the digital map in the same manner as the user-generated content, namely with reference to specific portions thereof.

For purposes of illustration, the techniques described herein make reference to existing and known networking infrastructure, such as the ubiquitous Internet and World Wide Web (WWW). Such references, however, are strictly exemplary and are not intended to limit the mechanisms described to the specific examples provided. Indeed, the techniques described are applicable to any environment within which information can be presented to others within the context of digital maps received via network communications.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
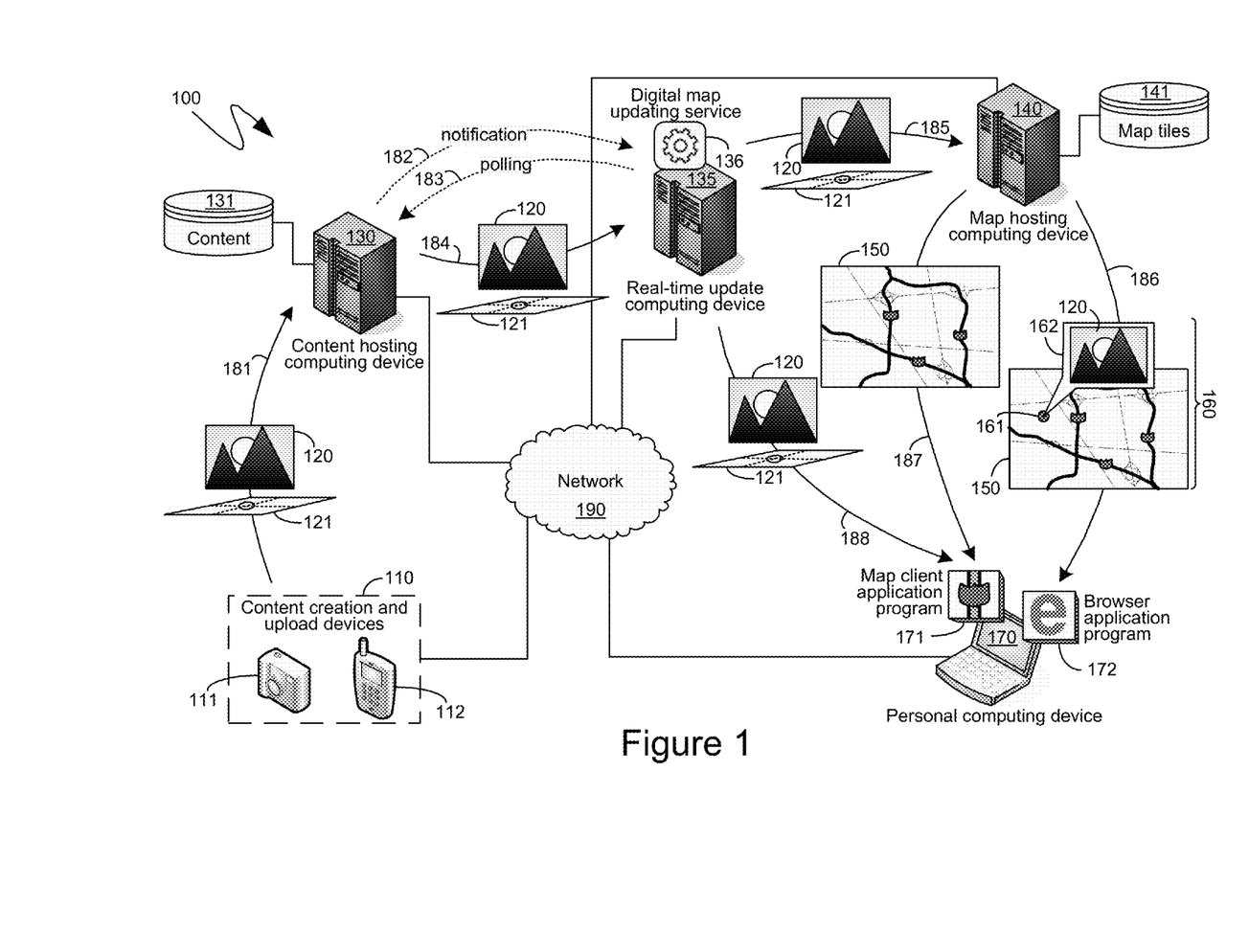
FIG. 1 is a block diagram of an exemplary provision of user-generated content within the context of a digital map in an expedited manner.

Turning to FIG. 1, an exemplary system 100 is shown, comprising content creation and uploaded devices 110, a content hosting computing device 130, a real-time update computing device 135, a map hosting computing device 140 and the personal computing device 170, all of which can be communicationally coupled to one another, such as via the network of computing devices 190. While only a single content hosting computing device 130, real-time update computing device 135, and map hosting computing device 140 are shown, those skilled in the art will recognize that they are intended to represent systems of one or more such computing devices where multiple instances of a common process, referred to in the descriptions below as executing on the one single computing device shown, can, instead, be executed across all of the individual computing devices of such systems of computing devices. Additionally, for purposes of illustration, like reference numerals are utilized in FIG. 1 to refer to like, although not necessarily identical, items. Thus, for example, the user-generated content 120 and associated geographic information 121 are referenced via the reference numerals 120 and 121, respectively, each time they are illustrated in the exemplary system 100 of FIG. 1 even though, for practical purposes, there are likely to be multiple copies of such user-generated content 120 and geographic information 121, and even though not each copy is necessarily formatted identically, such as, for example, when a thumbnail of an image is passed instead of the image itself. Nevertheless, the same reference numerals are meant to illustrate that, at a minimum, they are the same conceptual thing.

As will be described in further detail below, exemplary system 100 illustrates an exemplary mechanism by which user-generated content that is associated with a geographic location can be efficiently shared to other users, via the network 190, utilizing digital maps as a bedrock for such sharing. Initially, user-generated content, associated with the geographic location, can be generated, such as by the content creation and upload devices 110. For example, a user can take a digital picture with a digital camera 111 or a smart phone 112 either of which can have geo-tagging capabilities. As will be recognized by those skilled in the art, such geo-tagging capabilities are typically provided by Global Positioning System (GPS) hardware, such as can be built in to the digital camera 111 or the smartphone 112, or which can be part of another computing device that can interoperate with the content creation upload devices 110. Such geo-tagging capabilities can enable the content created by the content creation and upload devices 110 to have associated therewith a specific geographic location which can be, typically, the geographic location at which the content was created.

For illustrative purposes only, user-generated content 120 is shown in the form of a digital image, though, as will be recognized by those skilled in the art, the mechanisms described herein are equally applicable to any type of user-generated content including, but not limited to, digital images, digital audio recordings, digital video or other multimedia content, textual content, and the like. Additionally, the user-generated content 120 can comprise associated geographic information 121. For example, if the user-generated content 120 was a digital image, such as in the manner illustrated, that digital image can have been geo-tagged with geographic information 121. Typically, user-generated content 120, is generated by a user to preserve some aspect of a particular location or event, and is intended by the user that created it to be shared with other individuals. For example, a user may take digital images, of a family vacation, such as of a visit to a well-known landmark. As another example, a user may take digital images, of a noteworthy event that the user may wish to record and share with others such as, for example, a visit of a celebrity to the user's hometown.

To facilitate the sharing of digital information among users, content hosting services are available such that one user can upload digital information that they wish to share with others to such a content hosting service, via network communications, and then other users can, subsequently, access such information, again via network communications, from the content hosting service. In such a manner, the content hosting service can provide the relevant technical support for the sharing of content among multiple users, while each individual user need only be capable of uploading and downloading content from such content hosting service.

Thus, in one embodiment, user-generated content 120 and associated geographic information 121, can be provided to an existing content hosting service, such as can be provided by one or more content hosting computing devices, such as the content hosting computing device 130. Thus, as illustrated by the communication 181, a user can upload user-generated content 120 directly to a content hosting computing device, such as the content hosting computing device 130, via the network 190. Such user-generated content 120 can be stored as part of a content store 131 that can be communicationally coupled to the content hosting computing device 130.

One embodiment, when a computing device of a content hosting service, such as the content hosting computing device 130, receives user-generated content 120 and associated geographic information 121, it can issue a notification 182 to a digital map updating service 136, such as can be provided by the real-time update computing device 135. More specifically, a digital map updating service 136 can register with, or use a provided interface, to indicate the content hosting service that it wishes to be notified when a new user-generated content 120 is received. In one embodiment, such a registration can specify a particular geographic region with which a digital map updating service 136 can be associated. For example, the real-time update computing device 135, shown in the exemplary system 100 of FIG. 1, can be one of multiple real-time update computing devices that can each, independently, execute a digital map updating service, such as the digital map updating service 136, for a particular geographic region. If the geographic information 121 that is associated with user-generated content 120 is within the particular geographic region for which the real-time update computing device 135 is executing a digital map updating service 136, then the content hosting service can provide the notification 182 to such a real-time update computing device 135 notifying it of the receipt, by the content hosting computing device 130, of user-generated data content associated with a geographic location that is within its geographic region.

In an alternative, though potentially less efficient, embodiment, the digital map updating service 136 can continuously poll the content hosting service, such as via the polling communication 183, for new user-generated content 120. In such an alternative embodiment, the polling communication 183 can specify a particular geographic region for which the real-time update computing device 135 is requesting whether the content hosting computing device 130 has received any new user-generated content 120.

Once the digital map updating service 136 has been notified of new user-generated content 120, it can obtain such content, and the associated geographic location, such as via the communication 184. With the new user-generated content 120, the digital map updating service 136 that is provided by one or more real-time update computing devices, such as the real-time update computing device 135, can identify one or more components of a digital map through which such new user-generated content 120 can be presented to other users. As will be recognized by those skilled in the art, digital maps are often divided into components, such as components arranged in a quad tree representation, or map "tiles", in order to more efficiently deliver such digital maps to other users via network communications. Typically, each map component, or tile, depicts a determined geographic region, and different map tiles depict geographic regions of varying scope. Thus, for example, one set of tiles can present a geographic region at a certain scale while, another, greater set of tiles can depict the same geographic region at a larger scale, thereby enabling a user to "zoom into" or "zoom out of" specific portions of the digital map. Such map components can be maintained in a map tile store 141 that can be communicationally coupled to one or more map hosting computing devices, such as the map hosting computing device 140. Additionally, through known interfaces, the scale and geographic region covered by each one of the tiles in the map tile store 141 can be shared with other, external processes. For example, each of the tiles in the map tile store 141 can be individually referenced through a unique identifier often referred to as a "quadkey".

The digital map updating service 136 can be aware of the scale and geographic region covered by the tiles in the map tile store 141 and, based on such information, and the geographic information 121 that was associated with the new user-generated content 120 that was received by the digital map updating service 136, the digital map updating service 136 can determine to which of such tiles is an indication of the new user-generated content 120 to be added. Additionally, to the extent that a greater quantity of user-generated content exists for a particular geographic region than can reasonably be displayed within the context of the identified digital map tiles, a ranking algorithm can be applied to cull the user-generated content, and thereby select only the highest ranked ones to present indicia thereon via the digital map. Also, as will be recognized by those skilled in the art, digital maps can be utilized to present a wide variety of geographic-specific information to users through such mechanisms as map overlays, pushpins, callouts, or other like graphical user interface elements that can indicate a specific geographic location on a digital map and enable the user to receive further information about that specific geographic location. Thus, for example, digital map updating service 136, upon determining that the new user-generated content 120 is relevant to a specific map tile, can cause subsequent presentations of that map tile, to users, to comprise an indicator of the new user-generated content 120, appearing at a specific geographic location within the map tile that was identified by the geographic information 121 that is associated with the new user-generated content 120. Subsequently, the presentation of that map tile, such as by the map hosting computing device 140, to users can include the indicator of the user-generated content 120 that can have been added by the digital map updating service 136, such as one that can have been executing on the real-time update computing device 135.

Turning back to FIG. 1, in the exemplary system 100 shown therein, a digital map updating service 136 executing on the real-time update computing device 135 can, such as via the communication 185, provide the user-generated content 120 and associated geographic information 121 to a digital map hosting service being executed by one or more map hosting computing devices, such as the map hosting computing device 140. In addition, the communication 185 can identify one or more map tiles, such as those in the map tiles store 141, communicationally coupled to the map hosting computing device 140, on which such user-generated content 120 is to be indicated, and a specific location, within those map tiles where such user-generated content 120 is to be indicated. Subsequently, a user utilizing a personal computing device, such as exemplary personal computing device 170 shown in the system 100 of FIG. 1, can request one or more of the map tiles from the map hosting computing device 140. For example, a user can be utilizing a browser application program 172, executing on the personal computing device 170, to receive map tiles from the map hosting computing device 140 and, thereby, display a map on the personal computing device 170. In the illustrated embodiment, rather than receiving a map tile, such as the map tile 150, the browser application program 172 can, instead, receive a package 160 that can comprise the map tile 150 and an indicator 161 that can notify the user of personal computing device 170 of the existence of accessible user-generated content 120 that is associated with the geographic region indicated by the indicator 161. Subsequently, should the user of the personal computing device 170 interact with the browser application program 172 and direct a user action to the indicator 161 the user-generated content 120 can be presented to such a user, such as, for example, via a callout 162 or other like graphical presentation mechanism.

Nevertheless, the presentation of such user-generated content 120 via map tiles, such as the exemplary map tile 150, should not negatively impact the user's ability to view a digital map that is comprised of the map tiles. Thus, in one embodiment, only those map tiles presenting sufficient detail of the relevant geographic area can be selected by the digital map updating service 136, such as that being executed by the real-time update computing device 135, to indicate the existence of the user-generated content 120. Stated differently, in such an embodiment, user-generated content can be presented via map tiles that are sufficiently zoomed in to a particular geographic region such that the presentation of the user-generated content comprises only a small portion of the overall map tile. Conversely, for map tiles having a smaller scale and presenting a larger geographic region, such a larger geographic region could encompass multiple different geographic locations with which user-generated content was associated such that the presentation of such user-generated content via such smaller scale map tiles could overwhelm the presentation of the map data itself. In identifying, such as via the communication 185, which map tiles are to include indicia of user-generated content, the digital map updating service 136 can take such considerations into account and can identify only those map tiles having a sufficiently large scale, such that the indicia of the user-generated content, via such map tiles, is not overwhelming.

In another embodiment, again to avoid detracting from the digital map data itself, the digital map updating service 136 can continually modify which user-generated content is indicated via the map tiles. For example, the digital map updating service 136 can remove some indicia of older user-generated content and can emphasize newer user-generated content, when both such user-generated content are in the same geographic location. As another example the digital map updating service 136 can apply other, different types of filtering and ranking to determine which of the user-generated content within a specific geographic region, or at a specific geographic location, is to be indicated on which ones of the map tiles in the map tile store 141. In performing such determinations, the digital map updating service 136 can utilize existing mechanisms and technologies utilized by digital maps to determine when to display, for example, a location of a retail establishment or the like.

As can be seen, utilizing the above-described mechanisms, a user of a personal computing device, such the personal computing device 170, can, but is not necessarily required to, utilize a common browser application program 172 to access user-generated content 120 within the context of a digital map comprised of individual map tiles, such the map tile 150. In particular, one user can use the content creation and upload devices 110 to generate user-generated content 120, having associated geographic location information 121, which that user can then upload to a hosting service, such as that being executed on the content hosting computing device 130. Subsequently a digital map updating service 136, such as that executing the real-time update computing device 135, can receive such user-generated content 120 and can identify one or more of the map tiles, from the map tile store 141, on which such user-generated content 120 is to be indicated. Another user, utilizing a personal computing device, such as the personal computing device 170, can utilize a common browser application program, such as the browser application program 172, to obtain a digital map in the form of map tiles from the map hosting computing device 140. Some of those map tiles, such as, for example, the exemplary map tile 150 can comprise the indicator 161 of the user-generated content 120 that can have been added by the digital map updating service 136 executing in the real-time update computing device 135. More specifically, a base digital map layer, comprising base digital map tiles, such as the tile 150, can remain unchanged and the indicator 161 of user-generated content can be an overlay, such as could be contained on an overlay tile whose geographic scope is commensurate with its corresponding base digital map tile. In such a manner, a user could view the digital map without the user-generated content and the user-generated content can be efficiently updated, since only the overlay would need to be updated. Returning back to the package 160 that can comprise both the base digital map layer, such as in the form of the tile 150, and a user-generated content overlay layer, such as illustrated by the indicator 161, should the user of the personal computing device 170 direct the user action, such as to the browser application program 172, to the indicator 161 on the map tile 150, the user-generated content 120 can be presented to the user of the personal computing device 170, such as in a callout 162 or other like graphical presentation. In such a manner, content generated by a user using the content creation and upload devices 110 can be provided to another user, such as a user of the personal computing device 170, in an expedited manner.

In another embodiment, a user of a personal computing device, such as the personal computing device 170, can be utilizing a dedicated application program, such as the map client application program 171 which, like the browser application program 172, can execute on the personal computing device 170. In such an embodiment, the map client application program 171 can obtain map tiles, such as the exemplary map tile 150, from the map hosting computing device 140, as illustrated by the communication 187. The map client application program 171 can, further, register with the digital map updating service 136 executing on the real-time update computing device 135 to receive directly therefrom information regarding user-generated content, such as the user-generated content 120, that is to be displayed within the context of a digital map. More specifically, as indicated previously, the map tiles received by such a map client application program 171 from the map hosting device 140 can comprise the map tiles that comprise only the base digital map layer. The overlay that can comprise the indications of user-generated content can be received directly from the digital map updating service 136 by such a map client application program 171. In such an embodiment, rather than receiving a package 160 comprising both the map tile 150 and the indicator 161 of the location of user-generated content 120, a dedicated application program, such as the map client application program 171, can receive unedited map tiles from the map hosting computing device 140, as illustrated by the communication 187, and can receive, directly from the real-time update computing device 135, as illustrated by the communication 188, user-generated content 120 and associated geographic information 121 that can enable the map client application program 171 to generate an appropriate indicator on the map tiles it has received, so as to indicate the user-generated content 120.

More specifically, once the digital map updating service 136 executing on the real-time computing device 135 has identified ones of the map tiles stored in the map tiles store 141 that are to comprise an indicator of the user-generated content 120, the digital map updating service 136 can, likewise, inform the map client application program 171 of that same information.

The map client application program 171 can register with the digital map updating service 136, such as through an application program interface provided by the digital map updating service 136, and can, through such a registration, inform the digital map updating service 136 of which ones of the map tiles, from the map tile store 141, the map client application program 171 is currently consuming, or, alternatively, which geographic region the map client application program 171 is currently displaying, which the digital map updating service 136 can subsequently translate into an identification of the specific map tiles. Subsequently, once the digital map updating service 136 has identified specific ones of map tiles that are to be updated with indicators of new user-generated content, the digital map updating service 136 can check whether any map client application programs, such as the map client application program 171, are currently consuming those identified map tiles. If it is determined that some map client application programs are consuming the identified map tiles, then the digital map updating service 136 can communicate, such as via the communication 188, directly to such map client application programs the user-generated content 120 and associated geographic information 121 that can enable those map client application programs to generate their own indicators on the presented maps. Additionally, the digital map updating service 136 can communicate a specific location on the identified ones of the map tiles at which the map client application program 171 is specifically to display the indicator of the user-generated content 120.

As indicated previously, numerical identifiers, typically called "quadkeys" can be utilized to identify individual ones of the digital map tiles, such as the digital map tiles that can be stored in the map tile store 141. As will be known by those skilled in the art, such quadkeys can be utilized to both identify an individual digital map tile and to provide information about it, such as in the form of tile metadata. For example, extended quadkeys are generated from information specifying not only the geographic coordinates of boundaries of a map tile, but also from information indicating how such a tile is to be displayed and in what context is to be displayed. Thus, in one embodiment, the quadkeys of individual map tiles can be modified to include not only the information enumerated above, but also information regarding the presentation of indicators, such as the indicator 161, of user-generated content. For example, the generation of quadkeys for individual map tiles can include information such as a coordinate specification of where an indicator of user-generated content is to be placed within the context of a specific map tile, and a unique identifier of the user-generated content itself. In such a manner, the information provided by the digital map updating service 136 described above can be provided utilizing existing infrastructure.

Figure 2:
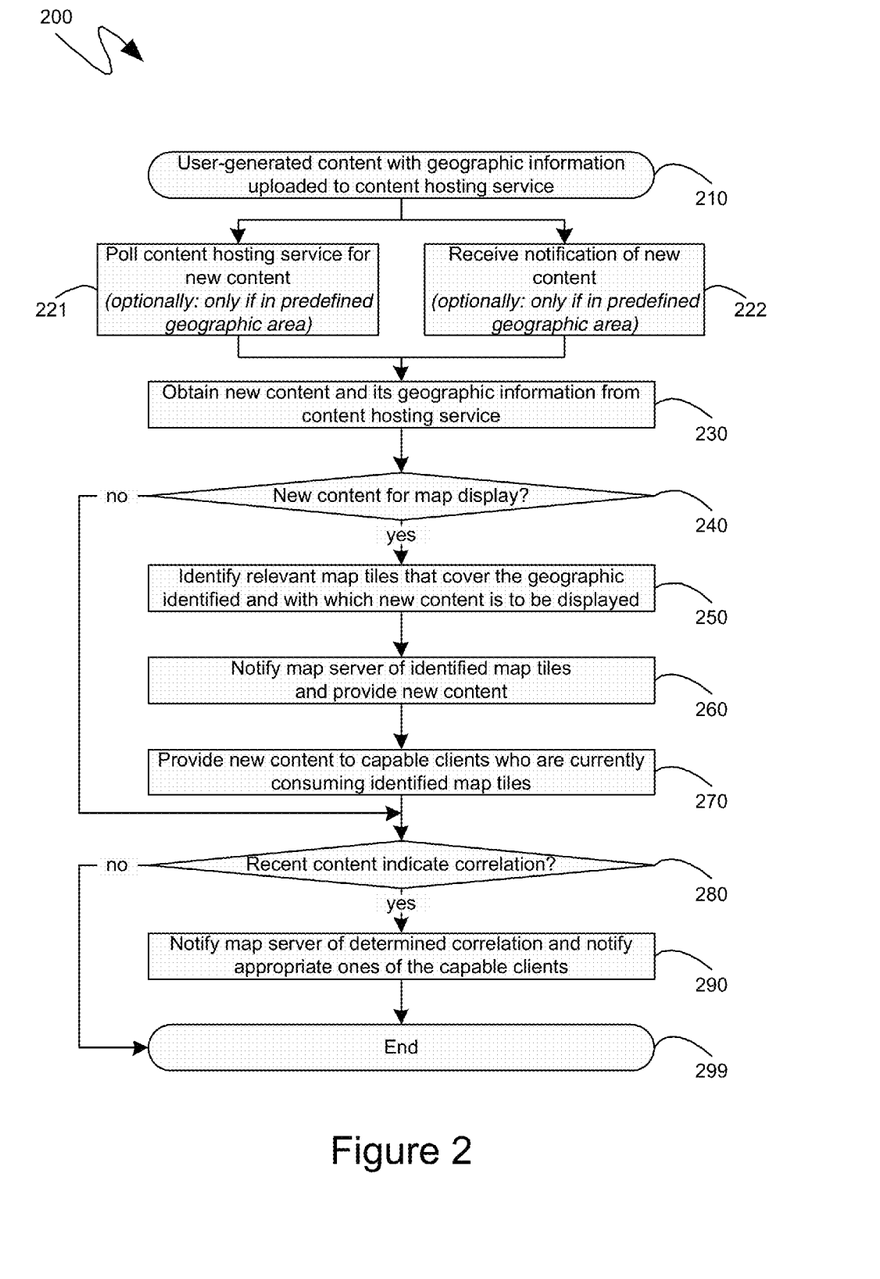
FIG. 2 is a flow diagram of an exemplary provision of user-generated content within the context of a digital map in an expedited manner.

Turning to FIG. 2, the exemplary flow diagram 200 shown therein illustrates an exemplary series of steps that can be performed to provide real-time updating of user-generated content within the context of a digital map. Initially, as illustrated by the step 210, user-generated content that has geographic information can be generated by a user and can be made available for sharing, such as by being uploaded to a content hosting service. Subsequently, at step 230, the user-generated content that was generated at step 210 can be obtained from the content hosting service or other network sharing location. In one embodiment, the user-generated content can be obtained at step 230 because a notification was received, at step 222, of the user-generated content that was generated at step 210. Alternatively, in another embodiment, the user-generated content can be obtained at step 230 because the content hosting service was polled, at step 221, to determine if any new user-generated content, such as the user-generated content generated at step 210, was received.

In one embodiment, as indicated previously, individual digital map updating services can provide real-time updating of user-generated content only within defined geographic regions. Such defined geographic regions can include geographic regions defined by governmental boundaries, population boundaries, driving times, and the like. Such defined geographic regions can also include user-defined regions. For example, a user may seek to receive updates of user-generated content that is associated with geographic locations within that user's town, or within the individual, discrete geographic locations, such as the locations of the homes of the user's family. In such an embodiment, the notification received at step 222 can be received only if the user-generated content that was generated at step 210 is within the geographic area that a digital map updating service provided to, for example, a content hosting service when such a digital map updating service registered for updates, such as the updates provided at step 222. Similarly, in such an embodiment, the polling at step 221 can poll the content hosting service for new content only within a defined geographic area of interest to the digital map updating service performing such polling.

Once the user-generated content, that was generated at step 210, is received from the content hosting service at step 230, a determination can be made, at step 240, whether the user-generated content is appropriate for being presented via a digital map. Some content, such as, for example, some types of textual content, may not be meaningful within the context of a digital map, even if such content is associated with a specific geographic location. If it is determined, at step 240, that the user-generated content received at step 230 is not appropriate for being presented to other users within the context of a digital map, processing can skip to step 280 which will be described in further detail below. Conversely, if it is determined, at step 240, that the user-generated content received at step 230 is appropriate for being presented to other users within the context of a digital map, processing can proceed with step 250 and appropriate components of a digital map, which cover the geographic location associated with the user-generated content that was received at step 230, can be identified.

As indicated previously, in identifying the relevant components of the digital map, such as individual map tiles, on which to provide indicators of the user-generated content that was received at step 230, consideration can be paid to the geographic scope of individual map tiles, such that map tiles having a larger scale and covering a smaller geographic area can be more likely to have an indicator of the user-generated content then map tiles having a smaller scale and covering a larger geographic area, since the latter likely covers a geographic area within which there can be a substantial amount of user-generated content, indicators of which could overwhelm the presentation of the map data itself. Nevertheless, as will be recognized by those skilled in the art, existing linking and filtering mechanisms can be applied to determine which user-generated content was an indicator at which map scale and on which individual digital map tiles.

Subsequently, at step 260, a map server can be notified of the tiles that were identified at step 250 and where on those tiles an indicator of the user-generated content received step 230 is to be placed. In such a manner, users obtaining such tiles through a generic browsing application program can still receive updated indicators of new user-generated content. At step 270, users interacting with a digital map through a dedicated application program, which can register itself to receive updates, can be provided information regarding the user-generated content received at step 230, and its geographic location, directly. More specifically, such dedicated application programs can register themselves and can identify which ones of the digital map tiles they are currently consuming. At step 270, then, for each one of those dedicated application programs that is currently consuming one of the map tiles that were identified at step 250, an indicator of the user-generated content that was received at step 230 can be provided, as well as the location on the specific map tile where such indicator is to be placed.

In one embodiment, user-generated content can provide data that can be mined for further information, such as by deducing the existence of events or incidents from the presence or receipt of user-generated content during specific times or from a specific geographic area. For example, an influx of user-generated data associated with a specific geographic location can indicate an incident or event at that location. For example, if a large quantity of user-generated data is suddenly received from a roadway, such a sudden, large influx of user-generated data from a geographic location that typically does not host such user-generated data can indicate that an incident has occurred at that location such as, for example, accident on the roadway. Similarly, an influx of user-generated data during only specific times of day, or specific days, or other like units of time, can indicate periodic events or events having temporal significance. For example, an influx of user-generated data during the days preceding Halloween from the geographic location in a rural area can indicate the presence of a pumpkin patch or other like event that may be of interest to users with families. As another example, an influx of user-generated data during only night-time hours from a specific geographic location can indicate the presence of a popular nightclub or other like destination that may be of interest to younger users.

Therefore, in one embodiment, at step 280, user-generated information that was received at step 230 can be compared with other user-generated data having similar associated geographic information to determine whether a correlation exists. If no correlation exists, then the relevant processing can end at step 299. Conversely, if a correlation is determined, then such a correlation can, likewise, be indicated on individual ones of the map tiles, at step 290, as well as being directly provided to compatible application programs indicating that they are currently consuming relevant map tiles. Relevant processing can then end at step 299.

Although not specifically illustrated, in one embodiment, the above-described mechanisms can enable collaborative interaction among multiple users. For example, a user utilizing one personal computing device executing a dedicated map client application program can receive an indicator on one of the map tiles being consumed by such an application program indicating the location of user-generated content. Upon viewing such user-generated content, however, such a user can determine that the user-generated content has been indicated in an improper location, and can change the geographic location associated with such user-generated content. Such a change can be communicated to the digital map updating service, such as that described in detail above, and executing on the real-time update computing device 135 shown in FIG. 1. The digital map updating service can then update appropriate ones of the map tiles that it identified previously, and can communicate the change to appropriate other ones of the dedicated application programs that have registered themselves with the digital map updating service and have indicated that they are currently consuming relevant map tiles. As another example, the user who generated the user-generated content in the first place can decide to remove such user-generated content and, instead, share different user-generated content. In such a case, the processing can proceed in the same manner as described, namely that such a change can be communicated to the digital map updating service, including via the content hosting service described in detail above. The digital map updating service can then update appropriate ones of the map tiles that it identified previously, and can communicate the change to appropriate other ones of the dedicated application programs that have registered themselves with the digital map updating service and have indicated that they are currently consuming relevant map tiles. In such a manner, not only can user-generated content be distributed efficiently and in a real-time manner to other users, but any edits made by those other users can, likewise, be distributed efficiently and in a real-time manner.

Figure 3:
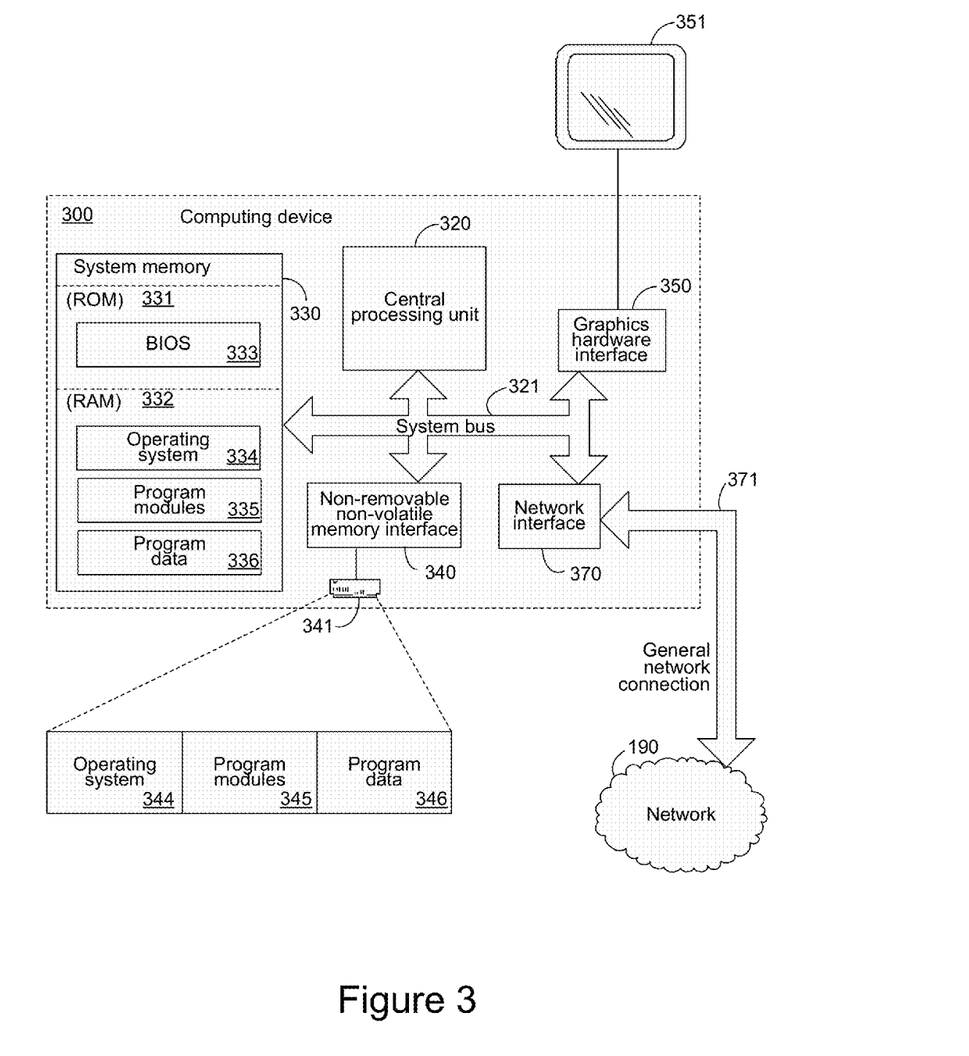
FIG. 3 is a block diagram of an exemplary computing device.

Turning to FIG. 3, an exemplary computing device 300 for implementing the above-described mechanisms is illustrated. The exemplary computing device 300 can be any one or more of the computing devices referenced above, such as those illustrated in FIG. 1, including, for example, the computing devices 110, 130, 135, 140 and 170, whose operation was described in detail above. The exemplary computing device 300 of FIG. 3 can include, but is not limited to, one or more central processing units (CPUs) 320, a system memory 330, that can include RAM 332, and a system bus 321 that couples various system components including the system memory to the processing unit 320. The system bus 321 may be any of several types of bus structures including a memory bus or memory controller, a peripheral bus, and a local bus using any of a variety of bus architectures. The computing device 300 can optionally include graphics hardware, such as for the display of obscured content in the situations described in detail above. The graphics hardware can include, but is not limited to, a graphics hardware interface 350 and a display device 351. Depending on the specific physical implementation, one or more of the CPUs 320, the system memory 330 and other components of the computing device 300 can be physically co-located, such as on a single chip. In such a case, some or all of the system bus 321 can be nothing more than silicon pathways within a single chip structure and its illustration in FIG. 3 can be nothing more than notational convenience for the purpose of illustration.

The computing device 300 also typically includes computer readable media, which can include any available media that can be accessed by computing device 300 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and the aforementioned RAM 332. A basic input/output system 333 (BIOS), containing the basic routines that help to transfer information between elements within computing device 300, such as during start-up, is typically stored in ROM 331. RAM 332 typically contains data and/or program modules that are immediately accessible to and/or presently being operated on by processing unit 320. By way of example, and not limitation, FIG. 3 illustrates the operating system 334 along with other program modules 335, and program data 336, which can include the above referenced network browser.

The computing device 300 may also include other removable/non-removable, volatile/nonvolatile computer storage media. By way of example only, FIG. 3 illustrates the hard disk drive 341 that reads from or writes to non-removable, non-volatile media. Other removable/non-removable, volatile/non-volatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the computing device 300. In FIG. 3, for example, hard disk drive 341 is illustrated as storing operating system 344, other program modules 345, and program data 346. Note that these components can either be the same as or different from operating system 334, other program modules 335 and program data 336. Operating system 344, other program modules 345 and program data 346 are given different numbers hereto illustrate that, at a minimum, they are different copies.

The computing device 300 can operate in a networked environment using logical connections to one or more remote computers. The computing device 300 is illustrated as being connected to a general network connection 371 through a network interface or adapter 370 which is, in turn, connected to the system bus 321. In a networked environment, program modules depicted relative to the computing device 300, or portions or peripherals thereof, may be stored in the memory of one or more other computing devices that are communicatively coupled to the computing device 300 through the general network connection 371. It will be appreciated that the network connections shown are exemplary and other means of establishing a communications link between computing devices may be used.

As can be seen from the above description, mechanisms for providing real-time updates of user-generated content within a digital map context have been provided. In view of the many possible variations of the subject matter described herein, we claim as our invention all such embodiments as may come within the scope of the following claims and equivalents thereto.

We claim:

1. One or more computer-readable memory comprising computer-executable instructions for providing efficient sharing of user-generated content through a digital map, the computer-executable instructions directed to steps comprising:
   registering to receive user-generated content, the registering comprising a specification of a defined geographic area such that only user-generated content associated with a geographic location located within the defined geographic area will be received on account of the registering;
   receiving a first user-generated content and a first geographic location associated therewith;
   identifying at least one digital map tile on which a presence of the first user-generated content is to be indicated, the identifying comprising determining that the first user-generated content is sufficiently highly ranked, as compared to other user-generated content that is also associated with geographic locations encompassed by the identified at least one digital map tile, so as to be indicated on the identified at least one digital map tile;
   specifying a first location on the at least one digital map tile, corresponding to the first geographic location as represented on the at least one digital map tile, for a first indicator indicating the presence of the first user-generated content; and
   transmitting the identification of the at least one digital map tile and the specification of the first location on the at least one digital map tile.

2. The computer-readable memory of claim 1, comprising further computer-executable instructions for providing an interface through which the dedicated application programs can register for updates comprising the transmission of the identification of the at least one digital map tile and the specification of the first location.

3. The computer-readable memory of claim 1, wherein the computer-executable instructions for registering to receive the user-generated content comprise computer-executable instructions for polling for the user-generated content.

4. The computer-readable memory of claim 1, wherein the computer-executable instructions for specifying the first location on the at least one digital map tile comprise computer-executable instructions for adding the first location to a numeric identifier of the at least one digital map tile.

5. The computer-readable memory of claim 1, further comprising computer-executable instructions for adding an identifier of the user-generated content to a numeric identifier of the at least one digital map tile.

6. The computer-readable memory of claim 1, comprising further computer-executable instructions for receiving a modification to either the first user-generated content or to the first geographic location and, in response to the receiving the modification, repeating the identifying, the specifying and the transmitting with the modification.

7. The computer-readable memory of claim 1, comprising further computer-executable instructions for correlating the first user-generated content with other user-generated content associated with the first geographic location and deducing, from the correlation, an event at the first geographic location.

8. The computer-readable memory of claim 7, wherein the computer-executable instructions for transmitting the identification of the at least one digital map tile and the specification of the first location further comprise computer-executable instructions for transmitting information regarding the deduced event.

9. The computer-readable memory of claim 1, comprising further computer-executable instructions for:
   selecting a digital map tile;
   identifying the other user-generated content that is also associated with geographic locations encompassed by the selected digital map tile;
   ranking the first user-generated content and the other user-generated content; and
   selecting one or more highest ranked user-generated content whose presence is to be indicated on the selected digital map tile, the selecting resulting in one or more unselected user-generated content whose presence will not be indicated on the selected digital map tile.

10. A method for providing efficient sharing of user-generated content through a digital map, the method comprising the steps of:
    registering to receive user-generated content, the registering comprising a specification of a defined geographic area such that only user-generated content associated with a geographic location located within the defined geographic area will be received on account of the registering;
    receiving a first user-generated content and a first geographic location associated therewith;
    identifying at least one digital map tile on which a presence of the first user-generated content is to be indicated, the identifying comprising determining that the first user-generated content is sufficiently highly ranked, as compared to other user-generated content that is also associated with geographic locations encompassed by the identified at least one digital map tile, so as to be indicated on the identified at least one digital map tile;
    specifying a first location on the at least one digital map tile, corresponding to the first geographic location as represented on the at least one digital map tile, for a first indicator indicating the presence of the first user-generated content; and
    transmitting the identification of the at least one digital map tile and the specification of the first location on the at least one digital map tile.

11. The method of claim 10, further comprising the steps of providing an interface through which the dedicated application programs can register for updates comprising the transmission of the identification of the at least one digital map tile and the specification of the first location.

12. The method of claim 10, wherein the specifying the first location on the at least one digital map tile comprises adding the first location to a numeric identifier of the at least one digital map tile.

13. The method of claim 10, further comprising the steps of receiving a modification to either the first user-generated content or to the first geographic location and, in response to the receiving the modification, repeating the identifying, the specifying and the transmitting with the modification.

14. The method of claim 10, further comprising the steps of:
    selecting a digital map tile;
    identifying the other user-generated content that is also associated with geographic locations encompassed by the selected digital map tile;
    ranking the first user-generated content and the other user-generated content; and
    selecting one or more highest ranked user-generated content whose presence is to be indicated on the selected digital map tile, the selecting resulting in one or more unselected user-generated content whose presence will not be indicated on the selected digital map tile.

15. A system for providing efficient sharing of user-generated content through a digital map, the system comprising:
    a content hosting computing device comprising user-generated content and geographic location information associated therewith;
    a map hosting computing device comprising map tiles; and
    a real-time update computing device comprising computer-executable instructions for:
      receiving a first user-generated content and a first geographic location associated therewith from the content hosting computing device;
      identifying at least one digital map tile from the map hosting computing device on which a presence of the first user-generated content is to be indicated, the identifying comprising determining that the first user-generated content is sufficiently highly ranked, as compared to other user-generated content that is also associated with geographic locations encompassed by the identified at least one digital map tile, so as to be indicated on the identified at least one digital map tile;
      specifying a first location on the at least one digital map tile, corresponding to the first geographic location as represented on the at least one digital map tile, for a first indicator indicating the presence of the first user-generated content; and
      transmitting the identification of the at least one digital map tile and the specification of the first location on the at least one digital map tile.

16. The system of claim 15, further comprising: at least one personal computing device executing a dedicated digital map viewing application program capable of receiving the map tiles from the map hosting computing device and the identification of the at least one digital map tile and the specification of the first location on the at least one digital map tile from the real-time update computing device; wherein the real-time update computing device comprises further computer-executable instructions for transmitting the identification of the at least one digital map tile and the specification of the first location on the at least one digital map tile to the at least one personal computing device executing the dedicated digital map viewing application program.

17. The system of claim 16, wherein the real-time update computing device comprises further computer-executable instructions for providing an interface through which the dedicated digital map viewing application program can register for updates comprising the transmission of the identification of the at least one digital map tile and the specification of the first location.

18. The system of claim 15, wherein the real-time update computing device comprises further computer-executable instructions for adding the first location to a numeric identifier of the at least one digital map tile.

19. The system of claim 15, wherein the real-time update computing device comprises further computer-executable instructions for receiving a modification to either the first user-generated content or to the first geographic location and, in response to the receiving the modification, repeating the identifying, the specifying and the transmitting with the modification.

20. The system of claim 15, wherein the real-time update computing device comprises further computer-executable instructions for:
- selecting a digital map tile;
- identifying the other user-generated content that is also associated with geographic locations encompassed by the selected digital map tile;
- ranking the first user-generated content and the other user-generated content; and
- selecting one or more highest ranked user-generated content whose presence is to be indicated on the selected digital map tile, the selecting resulting in one or more unselected user-generated content whose presence will not be indicated on the selected digital map tile.

* * * * *